United States Patent
Northrop et al.

[11] Patent Number: 5,964,189
[45] Date of Patent: Oct. 12, 1999

[54] MULTI-LEVEL PET HOUSE

[75] Inventors: Melaney Northrop, Cleburne; Michael D. Harper, Fort Worth, both of Tex.

[73] Assignee: Doskocil Manufacturing Company, Inc., Arlington, Tex.

[21] Appl. No.: 08/898,418

[22] Filed: Jul. 3, 1997

[51] Int. Cl.[6] .................................................. A01K 1/03
[52] U.S. Cl. ......................................... 119/482; 119/706
[58] Field of Search .................................... 119/482, 496, 119/706, 707, 708

[56] References Cited

U.S. PATENT DOCUMENTS

| | | | |
|---|---|---|---|
| 4,177,761 | 12/1979 | Bellocchi, Jr. | 119/482 |
| 4,347,807 | 9/1982 | Reich . | |
| 4,576,116 | 3/1986 | Binkert . | |
| 4,696,260 | 9/1987 | Panessidi | 119/482 |
| 4,803,952 | 2/1989 | Houser . | |
| 5,099,794 | 3/1992 | Pearce, Jr. . | |
| 5,148,768 | 9/1992 | Hinton | 119/482 X |
| 5,320,065 | 6/1994 | Leopold | 119/706 X |

*Primary Examiner*—Michael J Carone
*Assistant Examiner*—James S. Bergin
*Attorney, Agent, or Firm*—Kristin Jordan Harkins

[57] ABSTRACT

A multi-level cat playhouse and associated methods of assembly, disassembly and storage thereof. The playhouse includes an open-topped lower body portion having plural walls which define an interior space and a partially open-bottomed upper body portion, also having plural walls which, while also defining an interior space, are configured to fit within the lower interior space for storage purposes when the upper body portion is inverted and placed onto the lower body portion. When in use, a first portion of the lower interior space is covered by a removable separator mounted to generally horizontal ledges included as part of the walls of the lower body portion. By placing the upper body portion onto the lower body portion, a remaining portion of the lower interior space is covered by the bottom wall of the upper body while the removable separator provides a floor for the upper interior space. In this manner, the playhouse contains both lower and upper level interior chambers, each accessible through an access aperture respectively formed in the lower and upper body portions. By forming an aperture in the removable separator, access between the lower and upper interior chambers is permitted. By longitudinally foreshortening side walls of the upper body portion relative to side walls of the lower body portion, a top side surface of the partial bottom wall is suitable for use as a first elevated perch. A top wall of the upper body portion is suitable for use as a second elevated perch.

36 Claims, 3 Drawing Sheets

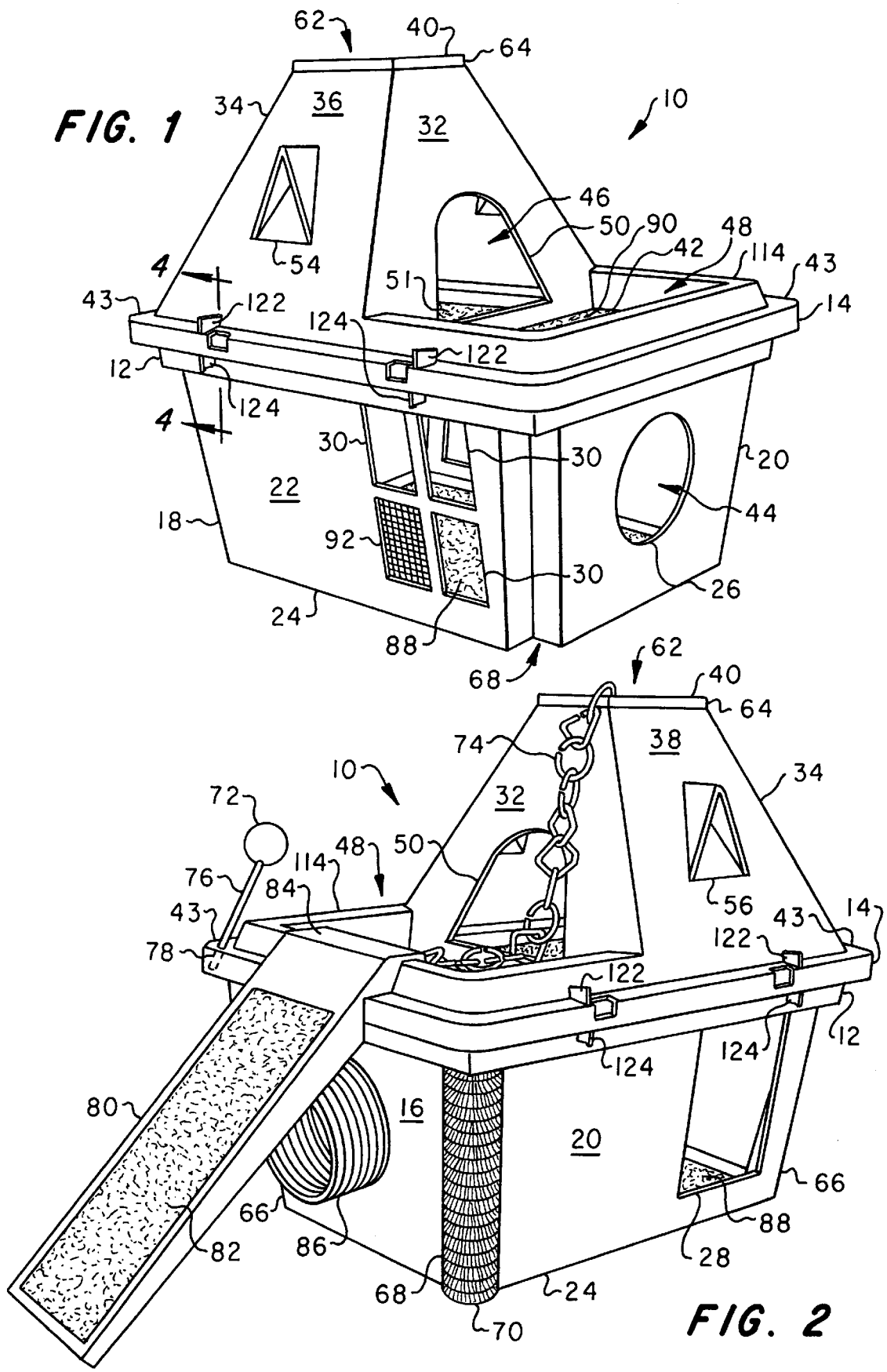

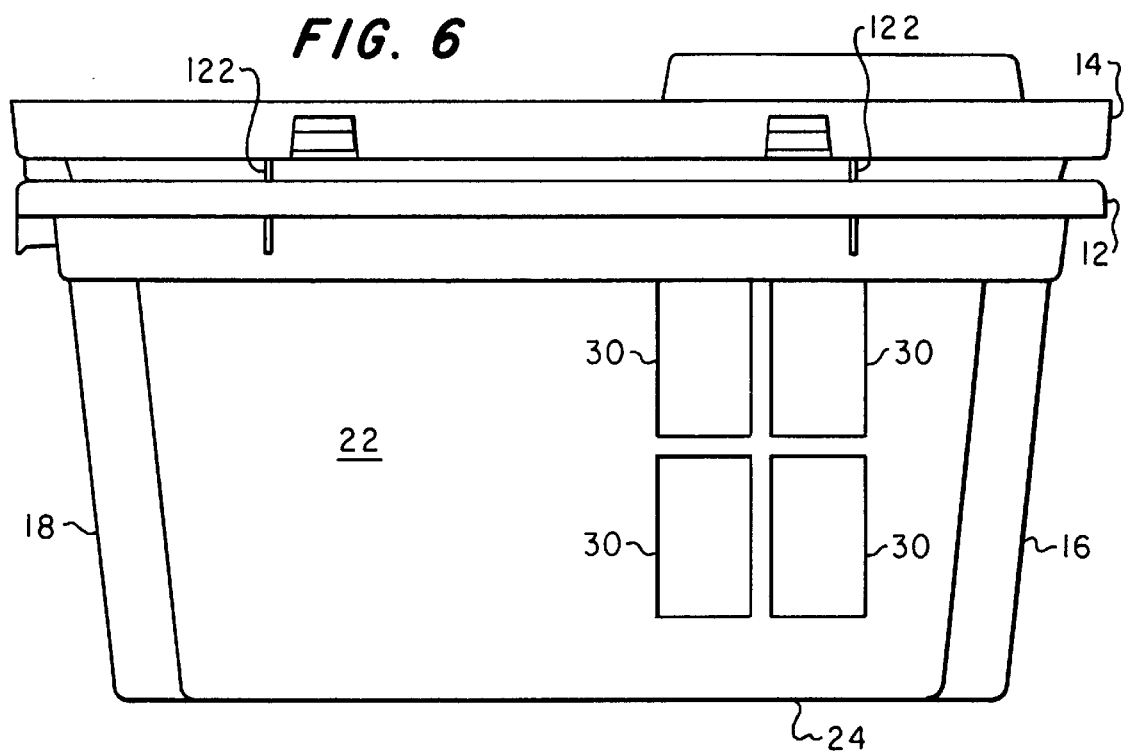
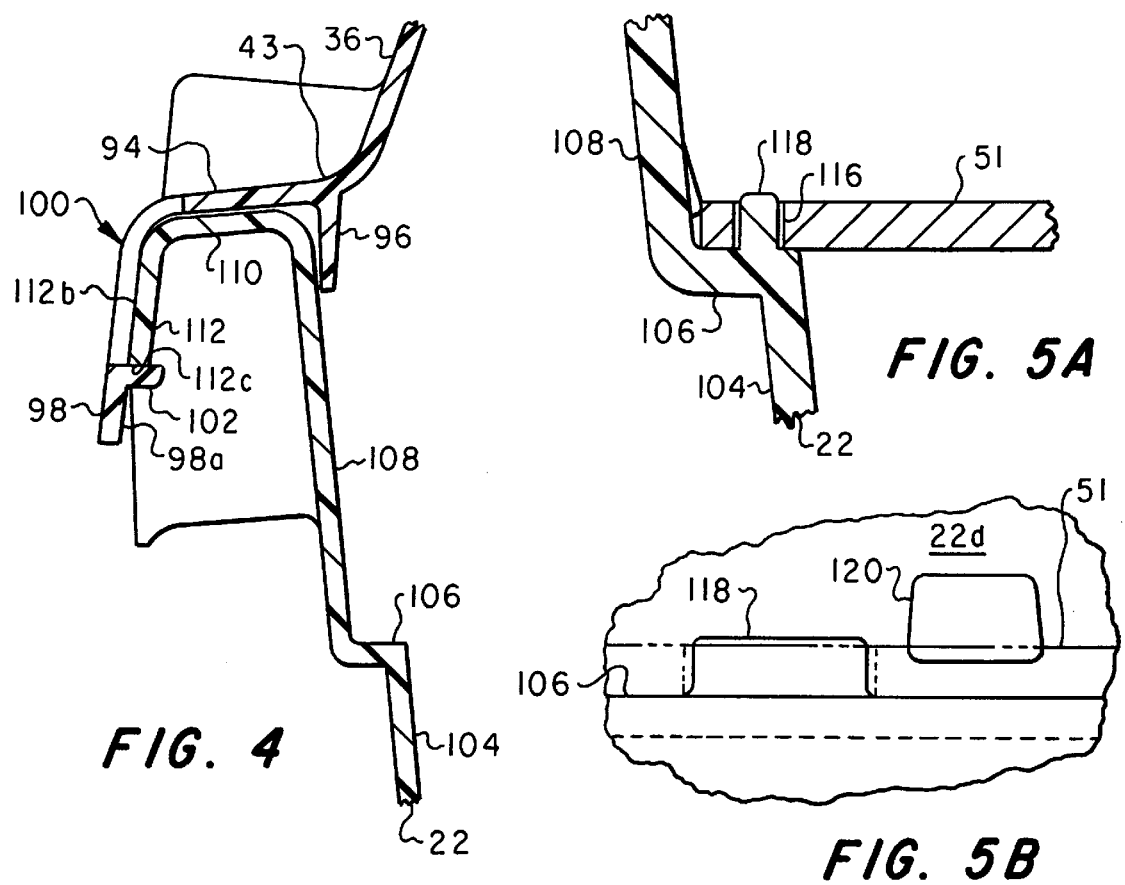

MULTI-LEVEL PET HOUSE

BACKGROUND OF THE INVENTION

1. Field of the Invention

The present invention relates generally to pet houses and, more particularly, to a multi-level cat playhouse which combines an interior chamber at each level, multiple accessways to each chamber thereof and plural play areas.

2. Description of Related Art

Various structures which house pets such as dogs and cats have been disclosed in the art. Such structures typically include an enclosed rest area which satisfies the animal's desire to "nest". Other, more elaborate, structures also include play areas. As they have the ability to satisfy an animal's need to rest, play, climb and watch, these elaborate structures, often referred to as "playhouses", are particularly well suited for cats.

Single level cat playhouses which provide for both rest and play are disclosed in U.S. Pat. Nos. 4,177,761 to Bellocchi, Jr. and 4,576,116 to Binkert. Binkert discloses a single level cat playhouse in which multiple cat amusement objects are suspended from an interior peak of the roof. Bellocchi, Jr. discloses a cat playhouse equipped with accessways in side and top walls thereof. A toy is supported by a wirelike spring member projecting upwardly from an upper side surface of the top wall and positioned so that a cat can reach the toy by reaching through the accessway in the top wall.

Multi-level cat playhouses are disclosed in U.S. Pat. Nos. 4,347,807 to Reich, 4,803,952 to Houser and 5,099,794 to Pearce, Jr. Reich discloses a multi-level "cat condominium" in which each of a series of stacked condominiums is provided with an accessway in a sidewall thereof and select ones of the shelves separating two of the stacked condominiums are formed with a cutout which enables passage between the adjoining condominiums. Houser discloses a multi-level animal shelter having a lower sheltered area and a smaller elevated sheltered area, each with accessways formed in a sidewall portion thereof. By differentially sizing the sheltered areas, a first area, suitable for resting, is provided immediately forward of the accessway to the elevated sheltered area. Additionally, by providing a flat top wall portion of the elevated sheltered area, an upper side surface of the top wall portion provides a second area suitable for resting. Finally, Pearce, Jr. discloses a two story housing unit for cats having a separate accessway for each story and an interior passageway which interconnects the two levels. While complexly configured, Pearce, Jr. lacks a variety of play areas and other features which tend to increase usage of the structure.

While complex playhouse structures such as those disclosed in Pearce, Jr. seek to combine aesthetics with a layout appealing to pets, such structures are often difficult to move and/or store, particularly if the structure includes multiple levels and/or a roof shaped to resemble the angled roof of a house or barn. Furthermore, as the transport and storage of such structures is often difficult, there has been little motivation to provide the aforementioned additional features which are often those most appealing to a cat.

It can be readily seen from the foregoing that it would be desirable to provide a cat playhouse which provides a variety of features which appeal to cats while maintaining relatively easy disassembly and compact storage thereof. Accordingly, it is an object of the present invention to provide such a cat playhouse.

SUMMARY OF THE INVENTION

In one embodiment, the present invention is of a multi-level pet house comprised of an open-topped lower body portion, a partially open-bottomed upper body portion and a removable separator located between the upper and lower body portions. The lower body portion includes a front wall in which a first access aperture is formed, a rear wall and first and second side walls which collectively define a first interior space while the upper body portion includes a front wall in which a second access aperture is formed, a rear wall, a partial bottom wall, a top wall and first and second side walls, the front, rear, top and first and second side walls thereof defining a second interior space. The removable separator is supportably mounted by the lower body portion such that it covers a first portion of the first interior space while the upper body portion is supportably mounted by the lower body portion such that the first and second interior spaces are in communication with each other via an access aperture formed in the removable separator and the partial bottom wall covers a second, remaining, portion of the first interior space.

In one aspect thereof, each of the rear, first side and second side walls of the lower body portion include a generally horizontal ledge on which the removable separator is supportably mounted. In another aspect thereof, a projection is formed on each of the ledges and corresponding slots formed in the removable separator. When the removable separated is supportably mounted by the ledges, the projections extend through the corresponding slots. In still another aspect thereof, each of the rear, first side and second side walls of the lower body portion include an interior side surface on which a latching projection is formed. When the removable separator is supportably mounted by the ledges, it is held in place by the latching projections. Finally, in other aspects thereof, a third access aperture is formed in the first side wall of the lower body portion and at least one viewing aperture is formed in the second side wall of the lower body portion.

In still another aspect of this embodiment of the invention, the partial bottom wall of the upper body portion extends forward of the front wall thereof. In an alternate aspect thereof, the first and second side walls of the upper body portion may be longitudinally foreshortened relative to the first and second side walls of the lower body portion. In further accordance with this alternate aspect, the bottom wall of the upper body portion may include an exposed top side surface which provides a first elevated perch area for the pet house. Preferably, the elevated perch is comprised of a recess formed in the bottom wall and extending from the top side surface of the bottom wall to an interior side surface which is generally level with the removable separator supportably mounted by the projections. In still further accordance with this alternate aspect, the top and bottom walls of the upper body portion are generally parallel to each other. In this aspect, an upper side surface of the top wall provides a second elevated perch area for the multi-level pet house. In a preferred embodiment, the front, rear, first and second side and top walls of the upper body portion are formed in a generally frusto-pyramidal shape and at least one of the first and second side walls thereof has a viewing aperture formed therein.

In accordance with various further aspects of this embodiment of the invention, the multi-level pet house may be configured with a variety of pet play accessories. In certain of these aspects, an aperture formed in the bottom wall of the upper body portion supportably mounts a pet play accessory to the upper body portion thereof by receiving a portion of the pet play accessory. In others, one or more pet play accessories are clip-mounted to the upper body portion. Conversely, in an alternate aspect of particular note, the aforementioned need for clip-mounted pet play accessories may be eliminated or substantially reduced by configuring the multi-level pet house such that one or more of the corners where the walls of the lower body portion are joined are cut-out to define pet play accessory-receiving recesses in which pet play accessories are mounted. Further, as a variety of pet play accessories can be readily mounted in and/or removed from the recesses, the pet play accessories can be frequently replaced to encourage continued play in the pet house. In still another, an angled scratching surface which provides access to the elevated portion may be coupled to the multi-level pet house while a tunnel may be mounted to the first access aperture.

In another embodiment, the present invention is of a pet house which includes a main body portion having a front wall in which a first access aperture is formed, an intermediate wall having a lower side surface which is supportably mounted on upper side surfaces of the front, as well as rear, first side and second side walls of the main body portion and in which an opening defined by a peripheral edge is formed, a projecting wall which extends upwardly from the peripheral edge of the opening and has a second access aperture formed therein and a top wall attached to an upper side surface of the projecting wall. The top, projecting and intermediate walls, together with the front, rear, first side and second side walls of the main body portion, define an interior chamber, access to which is provided, from the upper side surface of the intermediate wall, by the second access aperture.

In one aspect of this embodiment of the invention, means which separate the interior chamber into lower and upper chambers are also provided. In this aspect, the lower chamber is accessible by way of the first access aperture while the upper chamber is accessible by way of the second access aperture. In alternate aspects thereof, the separation means may include an interior wall which either covers a portion of the opening defined by the peripheral edge of the intermediate wall or has an interchamber access aperture formed therein. In various other aspects of this embodiment, the projecting wall may have a generally frusto-pyramidal shape or corners which join the walls of the main body portion and may be cut-out to define pet play accessory-receiving recesses in which pet play accessories are mounted.

In yet another embodiment, the present invention is of a method of assembling a multi-level pet house. An open-topped lower body portion, an interior wall and a partially open-bottomed upper body portion are first provided. The interior wall is supportably mounted on inner side surfaces of rear, first side and second side walls of the lower body portion to cover a first portion of a first interior space defined by front, rear, first side and second side walls of the lower body portion. The upper body portion is then supportably mounted on the lower body portion such that the first interior space is in communication with a second interior space defined by front, rear, top, first side and second side walls of the upper body portion via a second access aperture formed in the interior wall and a partial bottom wall of the upper body portion covers a second, remaining portion of the first interior space.

In still yet another embodiment, the present invention is of a method of disassembling and storing a multi-level pet house. First, a lower side surface of a partial bottom wall of an upper body portion of the multi-level pet house is disengaged from an upper side surface of a lower body portion of the multi-level pet house, thereby exposing one portion of a first interior space defined by a plurality of walls of the lower body portion. An interior wall positioned to cover another portion of the first interior space is then removed from the lower body portion. Next, an upper side surface of the partial bottom wall of the upper body portion is supportably mounted on the upper side surface of the lower body portion such that a plurality of walls which define a second interior space of the upper body portion are received in the first interior space of the lower body portion. In one aspect thereof, the upper body portion is inverted before supportably mounting the upper side surface of the partial bottom wall thereof on the upper side surface of the lower body portion.

BRIEF DESCRIPTION OF THE DRAWING

The invention will be better understood and its numerous objects and advantages will become apparent to those skilled in the art by reference to the following drawing in which:

FIG. 1 is a left perspective view of a multi-level cat playhouse constructed in accordance with the teachings of the present invention;

FIG. 2 is a first right perspective view of the multi-level cat playhouse of FIG. 1 equipped with various pet play accessories;

FIG. 4 is a cross-sectional view taken along lines 4—4 of FIG. 1 to illustrate attachment of the upper body portion of the multi-level cat playhouse to a lower body portion thereof;

FIG. 5A is a cross-sectional view taken along lines 5A—5A of FIG. 3A to illustrate attachment of the interior wall member of the multi-level cat playhouse to the lower body portion thereof;

FIG. 5B is a partial right side view, taken from the interior space, of an inner side surface of the lower body portion of the multi-level cat playhouse; and FIG. 6 is a side elevational view of the multi-level cat playhouse of FIGS. 1–2 upon insertion of the upper body portion, after inversion thereof, into the exposed interior space of the lower body portion.

DETAILED DESCRIPTION

Figure 3A:
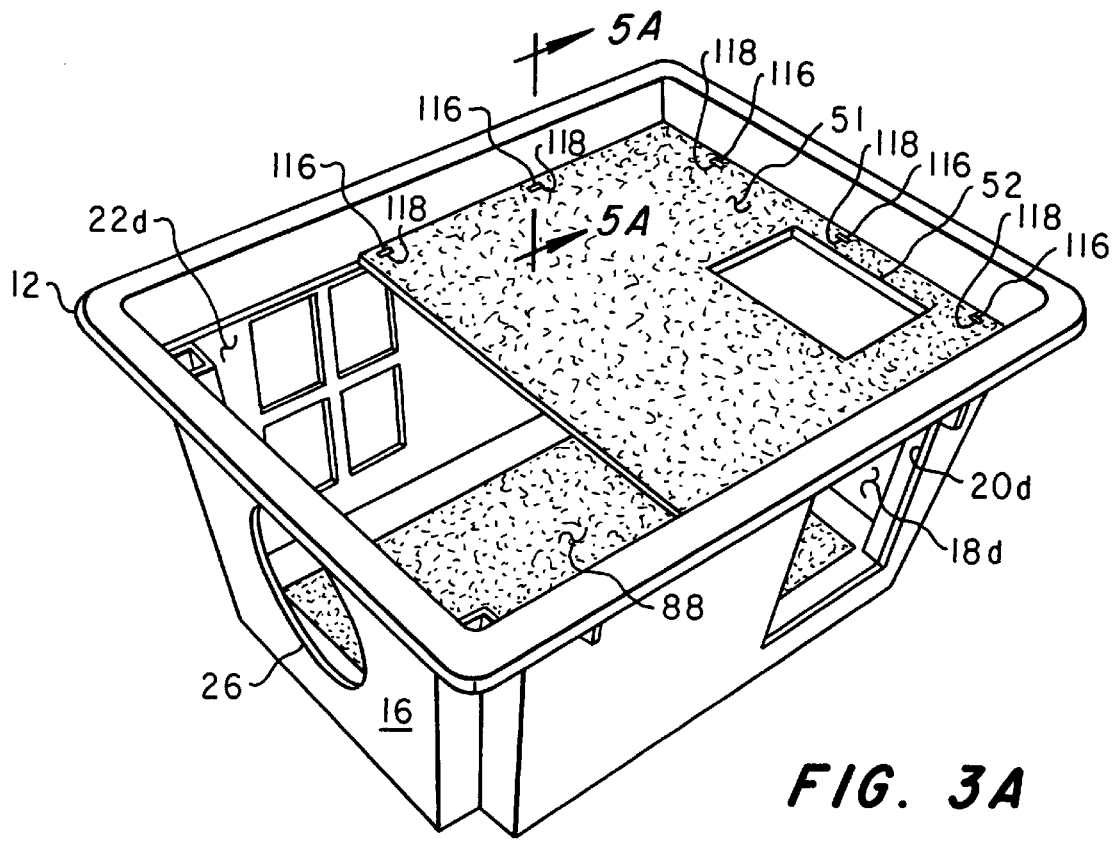
FIG. 3A is a second right perspective view of the multi-level cat playhouse of FIGS. 1–2 after an upper body portion thereof has been removed to partially expose an interior space thereof.

Referring now to FIG. 1, a multi-level cat playhouse 10 constructed in accordance with the teachings of the present invention will now be described in greater detail. The cat playhouse 10 is comprised of an open-topped lower body portion 12 and a partially open-bottomed upper body portion 14, both of which can be formed from a plastic material. Each of the lower and upper body portions 12 and 14 includes plural sidewalls which collectively define respective interior spaces therein. More specifically, the lower body portion 12 includes a generally planar rectangularly configured peripheral wall structure comprised of a front wall 16, a rear wall 18, a first side wall 20 and a second side wall 22, all of which extend upwardly from a bottom wall 24. A first interior space 44 is defined by the front, rear, first side, second side and bottom walls 16, 18, 20, 22 and 24 of the lower body portion 12.

Access to the first interior space 44 is provided by one or more access apertures formed in the walls which define the space. Preferably, the access apertures are of a size sufficient to accommodate entry of a cat into the first interior space 44. In the embodiment disclosed herein, first and second access apertures 26 and 28 are formed in the front wall 16 and the first side wall 20, respectively. To enhance the comfort of a cat or other animal reclined within the first interior space 44, it is preferred that a layer 88 of carpeting or other soft flooring material covers the interior of the bottom wall 24. In addition, plural viewing apertures 30 are formed in the second side wall 22. Of course, the number of access and viewing apertures formed in the lower body portion 12 is purely exemplary. It is preferred, however, that at least one access aperture be formed in the lower body portion 12.

The partially open-bottomed upper body portion 14 includes a partial bottom wall 42 having a peripheral edge 43. In a forward portion thereof, the partial bottom wall 42 is solid while, in a rearward portion thereof, only the peripheral edge 43 which, as will be more fully described below, defines an aperture in the rearward portion of the partial bottom wall 42, is present. Also in the rearward portion thereof, a second generally planar rectangularly configured peripheral wall structure comprised of a front wall 32, a rear wall 34, a first side wall 36 and a second side wall 38, all of which upwardly extend from the peripheral edge 43 of the partial bottom wall 42 to a top wall 40. Preferably, the top wall 40 is generally parallel with the partial bottom wall 42.

In the rearward portion of the upper body portion 14, a second interior space 46 is defined by the peripheral edge 43 of the partial bottom wall 42 and the front, rear, first side, second side and top walls 32, 34, 36, 38 and 40. Preferably, the lengthwise dimension of the first side and second side walls 36 and 38 of the upper body portion 14 should be substantially less than the corresponding dimension of the first side and second side walls 20 and 22 of the lower body portion 12. For example, the length of the first side and second side walls 36 and 38 may be about one-half of the length of the first side and second side walls 20 and 22. The front, rear, first side and second side walls 32, 34, 36 and 38 are formed at an obtuse angle relative to the peripheral edge 43 of the partial bottom wall 42. Accordingly, as the top wall 40 is generally parallel with the partial bottom wall 42, the portion of the upper body portion 14 which defines the second interior space 46 is configured in a generally frusto-pyramidal shape.

Access to the second interior space 46 is provided by a third access aperture 50, this one formed in the front wall 32. In addition, the second interior space 46 is in communication with the first interior space 44 by way of an interior access aperture 52 to be more fully described below. Finally, viewing apertures 54 and 56 are respectively formed in each of the first side and second side walls 36 and 38. To enhance the ornamental appearance of the cat playhouse 10, the viewing apertures 54, 56 are shaped to resemble a gable of a house. It is fully contemplated, however, that non-ornamental apertures would be equally suitable for the uses contemplated herein. Although not illustrated herein, to further enhance the ornamental appearance thereof, one or both of the lower and upper body portions 12 and 14 may be shaped to resemble a shingled structure. By doing so, the cat playhouse 10 appears similar to a Victorian-era house.

As previously set forth, the first interior space 44 is defined by the front, rear, first side and second side walls 16, 18, 20 and 22 of the open-topped lower body portion 12. As to be more fully described below, mounted to interior side surfaces 20d, 18d and 22d of the first side, rear and second side walls 20, 18 and 22 of the lower body portion 12 is a removable separator 51 having the aperture 52 formed therein. As will be more fully described below, the removable separator 51 functions as a floor for the second interior space 46 and as a first part of a ceiling for the first interior space 44. The removable separator 51 is sized to be slightly less than the dimensions of the aperture defined by the peripheral edge 43 of the partial bottom wall 42 of the upper body portion 14. As is best seen in FIG. 3A, the removable separator 51 functions as part of the ceiling for the first interior space 44 by covering a first portion of the first interior space 44 of the lower body portion 12 while the aperture 52 formed therein provides an accessway between the first interior space 44 of the lower body portion 12 and the second interior space 46 of the upper body portion 14 when mounted thereon. Alternately, the removable separator 51 may be sized substantially less than the dimensions of the aperture defined by the peripheral edge 43 of the partial bottom wall 42 of the upper body portion 14. In this alternate configuration, the aperture 52 is not needed since the space between the edge of the removable separator and the peripheral edge 43 serves as the aperture 52.

To function as the floor for the second interior space 46, the removable separator 51 must be fixedly attached to the lower body portion 12. However, as will be more fully described below, the removable separator 51 must also be readily removable. Turning, therefore, to FIGS. 5A–B, the manner by which the removable separator 51 is attached to the lower body portion 12 will now be described in greater detail. Similar to the second side wall 22 shown in FIG. 5A, each of the walls of the lower body portion 12 include first and second vertical wall parts 104 and 108 separated by a bend in the side wall 22 which forms a first horizontal ledge 106. Thus, the removable separator 51 rests on the horizontal ledges 106 of the first side, rear and second side walls 20, 18 and 22. To secure the removable separator 51 on the horizontal ledges 106, slots 116 are formed in the removable separator 51. Each slot 116 formed therein corresponds to a projection 118 formed on the horizontal ledges 106. As the removable separator 51 is placed on the ledges 106, each one of the projections 118 extend through the corresponding one of the slots 116. Formed on and along the interior side surfaces 20d, 18d and 22d of the first side, rear and second side walls 20, 18 and 22 are latching projections 120. As the removable separator 51 is placed on the horizontal ledges 106 such that the projections 118 extend through the slots 116, the latching projections 120 secure the removable separator 51 in place such that, in order to remove the removable separator 51, the removable separator 51 would have to be deformed slightly so that it can be pulled over the latching projections 120. Thus, it is highly unlikely that movement by a cat occupying the playhouse 10 would accidently dislodge the removable separator 51.

When fully assembled, the upper body portion 14 of the cat playhouse 10 is supportably mounted on the lower body portion 12. As best seen in FIG. 4, the front, rear, first side and second side walls 16, 18, 20 and 22 of the lower body portion 12 and the peripheral edge 43 of the upper body portion 14 are shaped such that, when the upper body portion 14 is lowered onto the lower body portion 12, the upper body portion 14 mates with the lower body portion 12 in a snap-mount. As previously mentioned, each of the walls of the lower body portion 12 include the first and second vertical wall parts 104 and 108 separated by the bend in the wall which forms the first horizontal ledge 106 which has been shown in detail for only the second side wall 22. As may now be further seen, the vertical extension of the second wall part 108 continues until an outward bend which forms a second horizontal ledge 110. In turn, the ledge 110 bends downwardly to form a lip 112. Conversely, for the first and second side walls of the upper body portion, the peripheral edge 43 is comprised of a generally horizontal central portion 94 sized somewhat larger than the second horizontal ledge 110, a first downwardly extending flange 96 and a second downwardly extending flange 98. When the upper body portion 14 is lowered onto the lower body portion 12, the first and second flanges 96 and 98 frictionally engage the second wall part 108 and the lip 112, respectively. A protrusion 102 formed on an inner side surface 98a of the second flange 98 rides along an outer side surface 112b of the lip 112 and, as a result of the gradual outward taper of the lip 112, the second flange 98 bends outwardly. Upon reaching an end surface 112c of the lip 112, the second flange 98 returns to its original shape. As a notch 100 is formed immediately above the protrusion 102, as the second flange 98 returns to its original shape, the protrusion 102 is able to slide across the outer side surface 112b of the lip 112 to latch the upper body portion 14 to the lower body portion 12.

Returning now to FIG. 1, upon latching the upper body portion 14 to the lower body portion 12, the solid walled, forward portion of the lower side surface of the bottom wall 42 functions as a second part of the ceiling for the first interior space 44 by covering a second portion of the first interior space 44 while the second interior space 46 is simultaneously placed in communication with the first interior space 44 via the aperture 52. Thusly, the first interior space 44 becomes a lower interior chamber in which the removable separator 51 and the partial bottom wall 42 of the upper body portion 14 collectively form a ceiling thereof while the second interior space 46 becomes an upper interior chamber in which the removable separator 51 forms the floor thereof.

As will also be more fully described below, in addition to the second interior space 46, the upper level of the cat playhouse 10 further includes a first exterior area 48 suitable for use as a first elevated perch area. More specifically, the first exterior area 48 is comprised of a selected portion of a top side surface of the partial bottom wall 42 of the upper body portion 14. In the embodiment disclosed herein, the exterior area 48 is shaped to resemble a small, open ended box by forming an appropriately shaped indentation, relative to the peripheral edge 43, in the top side surface of the partial bottom wall 42. By depressing the first exterior area 48 of the partial bottom wall 42 relative to the peripheral edge 43, boundaries of the first exterior area 48 are better defined. Boundaries of the first exterior area 48 can be further enhanced by forming a wall 114 which projects upwardly from the peripheral edge 43. Furthermore, as a result of the degree of enclosure provided by the depression of the first exterior area 48, it is contemplated that an animal reclined therein would most likely experience a greater degree of security than if the first exterior area 48 was not depressed relative to the peripheral edge 43 of the partial bottom wall 42. Finally, it is further contemplated that, to enhance the comfort of a cat or other animal reclined within the first exterior area 48, it is preferred that a layer 90 of carpeting or other soft flooring material cover the depressed portion of the partial bottom wall 42 which defines the first exterior area 48.

Continuing to refer to FIG. 1, as the top wall 40 of the upper body portion 14 is generally parallel to the partial bottom wall 42 thereof, a second exterior area 62 suitable for use as a second elevated perch area is also provided. As disclosed herein, the second exterior area 62 is comprised of the top wall 40 surrounded, along its periphery, by a slightly elevated ridge 64. In a fashion similar to the first exterior area 48, it is contemplated that the elevated ridge 64 will provide a limited degree of enclosure to a cat or other animal reclined therein. Furthermore, while not visible in the drawing, it is preferred that, to enhance the comfort of an animal reclined thereon, a layer of carpeting or other soft flooring material covers a top side surface of the top wall 40. Furthermore, as the top side surface of the top wall 40 is sized identically to the aperture 52, the excess carpet produced when forming the aperture 52 in the removable separator 51 may be used to cover the top side surface of the top wall 40.

While the cat playhouse 10 is uniquely configured to provide a combination of interior spaces, exterior surfaces and accessways therebetween, it is contemplated that various cat play accessories may be coupled to the cat playhouse 10 to increase the animal's level of interest in the structure. Various ones of these may be seen by reference to FIG. 2.

As may now be seen, an angled scratching surface 80 which extends from the floor or other support surface on which the cat playhouse 10 rests to the first exterior area 48. Preferably, the angled scratching surface 80 is comprised of a length of a plastic or other suitable material on which a layer 82 of carpeting or another textured material has been attached to a top side surface thereof. A first end of the angled scratching surface 80 rests on the floor while a second end 84 is attached to the partial bottom wall 42 of the upper body portion 14. To enhance attachment of the second end 84 to the partial bottom wall 42, the second end 84 may be hinged or otherwise bent relative to the remainder of the angled scratching surface 80. Preferably, however, a top side surface of the partial bottom wall 42 and a lower side surface of the angled scratching surface 80 are complementarily shaped so that the two may be fitted together. Once fitted or otherwise supported thereby, the angled scratching surface 80 may be attached to the upper body portion 14 in a variety of ways. For example, a layer of velcro-like material may be placed on a lower side surface of the second end 84. In addition to its use as a scratching surface, the angled scratching surface 80 provides a structure under which the cat can hide. Furthermore, while it is specifically contemplated that the angled scratching surface 80 may be attached to any side of the upper body portion 14, it is been discovered that additional advantages are provided by attaching the angled scratching surface 80 to the front side of the upper body portion 14 as illustrated in FIG. 2. When placed in this manner, the angled scratching surface 80 may also serve as a ramp on which the cat may walk directly to the first exterior area 48 and enter the second interior space 46 through the aperture 50.

As is also shown in FIG. 2, a tunnel 86 which covers the first access aperture 26 may also be provided. Similar to the angled scratching surface 80, the tunnel 86 provides another point of interest to the cat using the cat playhouse 10. While the tunnel 86 is primarily expected to be used as a "different" type of entryway to the first interior area 44, it is contemplated that many cats would also use the tunnel 86 as a hiding place. Preferably, the tunnel 86 would be formed of a flexible translucent material and be expandable along its length. For ease of illustration, however, FIG. 2 shows the tunnel 86 fully compressed. When expanded, however, the tunnel 86, if used in conjunction with the angled scratching surface 80 attached to the front side of the upper body portion, may need to be bent to avoid an entryway to the tunnel 86 from being blocked by the lower side surface of the angled scratching surface 80. Preferably, the tunnel 86 includes a lip (not shown) which frictionally engages the periphery of the first access aperture 26 to mount the tunnel 86 to the lower body portion 12 of the cat playhouse 10. However, it should be clearly understood that there are a variety of alternative techniques by which the tunnel 86 may be mounted to the lower body portion 12 of the cat playhouse 10 to cover the first access aperture 26.

Returning momentarily to FIG. 1, yet another cat play accessory will now be described in greater detail. As previously described, plural viewing apertures 30 are formed in the first side and second side walls 20 and 22 of the lower body portion 12. To enhance the sense of enclosure to a cat located in the first interior space 44, one or more of the viewing apertures 30 may be covered with a grid 92 of woven material. Preferably, the grid 92 includes a peripheral edge surface suitable for removable attachment to the edge side surfaces which define the viewing aperture 30. Of course, similar grids may be installed to cover selected others of the access apertures, for example, the first access aperture 26, the second access aperture 28, the third access aperture 50 and/or the interior access aperture 52.

Returning now to FIG. 2, a variety of still other cat play accessories, including rubbing devices, scratching devices, tease toys and hiding toys, suitable for mounting to the cat playhouse 10 will now be described in greater detail. As previously set forth, the lower body portion 12 includes front, rear, first side and second side walls 16, 18, 20 and 22. The front and second side walls 16 and 22, the second side and rear walls 22 and 18, the rear and first side walls 18 and 20 and the first side and front walls 20 and 16 are joined at respective corners 66. In accordance with one aspect of the invention, at least one of the corners 66 should be recessed, i.e. interior side surfaces of the walls which join to form the corner are exposed and the walls joined together at an orthogonal angle inverted to that of the corner itself.

It is well know that cats have a tendency to rub their sides against objects and that providing materials having different textures or "feels" for a cat to rub against can occupy the cat for a period of time. Being positioned where a cat can easily rub against, recesses formed at corners of the lower body portion 12, for example, recesses 68, are particularly well suited for insertably mounting rubbing or scratching devices 70 which provide a different texture for the cat to rub against. For example, a bristle brush, a fluffy brush or a wound sisal rope will be particularly well suited for use as a rubbing device. In many cases, the rubbing or scratching devices 70 will include a twisted wire base which is hung in the recess 68. Of course, the rubbing or scratching device 70 may be mounted to the lower body portion 12 in a variety of manners. For example, for the bristle or fluffy brush having a twisted wire base, a portion of the wire base may instead be insertably mounted in an aperture formed in the lower body portion 12. However, all of the variously configured rubbing or scratching devices 70 should be readily mountable in the recess 68. By doing so, all of the rubbing or scratching devices 70 would be readily interchangeable with each other. It is generally acknowledged that, after becoming familiar with a particular rubbing or scratching device, a cat often loses interest in the device. By replacing it with a second device less familiar to the cat, it is possible to developed a renewed interest in the cat play accessory and, concomitantly, in the multi-level cat playhouse 10. Of course, rubbing or scratching devices need not be limited to the aforementioned materials and/or to placement within the recesses 68. For example, an additional rubbing device may be provided by attaching a piece of foam to a selected surface of the lower body portion 12 using an adhesive material.

Another category of cat play accessories designed to hold the cat's interest for periods of time are generally referred to as tease toys. Two such tease toys are illustrated in FIG. 2, bell ball 72 and link chain 74. The bell ball 72 is attached to a shaft 76 which is insertably mounted in an aperture 78 (shown in phantom in FIG. 2) formed in the peripheral edge 43 of the upper body portion 14. The link chain 74, on the other hand, is linked to the elevated ridge 64 of the top wall 40. As before, additional tease toys other than the particular ones illustrated in FIG. 2 may be mounted to the cat playhouse 10 in various fashions. These include such tease toys as feathered and/or beaded objects. Furthermore, other techniques by which the tease toys may be mounted to the cat playhouse 10 include the use of clips for mounting a tease toy attached thereto to a selected edge of the cat playhouse 10.

Figure 3B:
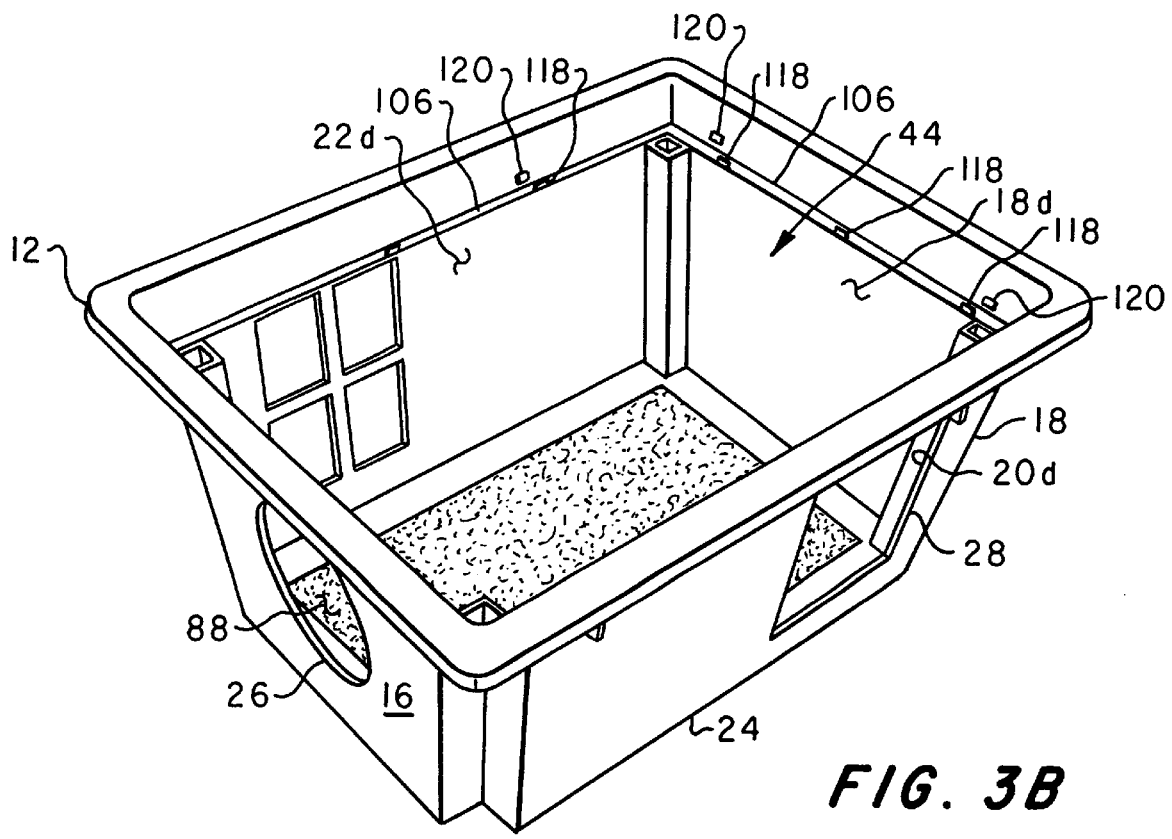
FIG. 3B is a third right perspective view of the multi-level cat playhouse of FIGS. 1–2 after further removal of an interior wall member therefrom to fully expose the interior space thereof.

Another feature of the cat playhouse 10 is that it is particularly well suited for easy assembly, disassembly and compact storage thereof. Turning to FIGS. 3A–C, this feature will now be described at greater length. The cat playhouse 10 is comprised of two primary parts—the lower body portion 12 and the upper body portion 14. Each body portion 12, 14 is comprised of plural walls which define the respective lower and upper interior spaces 44 and 46. When fully assembled, the upper body portion 14 is mated with the lower body portion 12 in a snapmount. To disassemble the cat playhouse 10, the upper body portion 14 is first removed by grasping the inner side surfaces 98a of the second flanges 98 until the protrusions 102 clear the lips 112 and then lifting off the upper body portion 14, thereby revealing the lower body portion 12 and the removable separator 51 as shown in FIG. 3A. As may now be more clearly seen, the removable separator 51 is supportably mounted on the ledges 106 provided on the interior side surfaces 20d, 18d and 22d of the first side, rear and second side walls 20, 18 and 22 of the lower body portion 12 such that it covers the first portion of the first interior space 44. Next, the removable separator 51 itself is removed, for example, using a pulling up on a lower side thereof, thereby uncovering the remainder of the first interior space 44. As may now be seen in FIG. 3B, the removable separator 51 is supportably mounted in place by the previously described combination of the ledges 106, the projections 118 and the latching projections 120 provided along the interior side surfaces 20d, 18d and 22d of the first side, rear and second side walls 20, 18 and 22, respectively. Preferably, the ledges 106 are positioned such that, when the removable separator 51 is supportably mounted thereon, a top side surface thereof is generally level with the first exterior area 48. Finally, the upper body portion 14 is inverted and the second interior space 44 defined by the front, first side, rear and second side walls 32, 36, 34 and 38 of the upper body portion 14 is insertably received in the first interior space 44 defined by the front, first side, rear and second side walls 16, 20, 18 and 22 of the lower body portion 12. Preferably, however, spacing tabs 122 formed on the upper body portion 14 will separate the upper side surface of the upper body portion 14 from directly engaging the upper side surface of the lower body portion 12. Since, however, the height of the cat playhouse 10 has now been substantially reduced, the cat playhouse 10 is now better suited for storage. In a similar fashion, spacing tabs 124 formed on the lower body portion 12 are used to separate lower body portions 12 when stacked together.

Thus, there has been described and illustrated herein, a multi-level cat playhouse which combines an interior chamber at each level, multiple accessways to each interior chamber thereof and plural elevated perch areas. By uniquely configuring the cat playhouse to include a variety of interconnectable chamber and/or perch areas, the resultant structure is able to attract and maintain the interest of the cat. The playhouse structure is also uniquely adapted for installation of a variety of cat play accessories designed to maintain interest in the playhouse long after the initial novelty has worn out. Finally, the playhouse structure is arranged for easy assembly, disassembly and storage.

However, those skilled in the art will recognize that numerous modifications and variations from that specifically disclosed herein are possible without substantially departing from the scope of the present invention. It should be clearly understood, therefore, that the embodiment of the invention disclosed herein is considered to be exemplary only and should not be construed as limiting the invention, which is defined only by the claims appended hereto.

What is claimed is:

1. A multi-level pet house, comprising:
    an open-topped lower body portion having a plurality of walls which defines a first interior space, said plurality of walls of said lower body portion including a front wall in which a first access aperture is formed, a rear wall and first and second side walls;
    a removable separator supportably mounted on said lower body portion, said removable separator covering a first portion of said first interior space and having a second access aperture formed therein;
    a partially open-bottomed upper body portion having a front wall in which a third access aperture is formed, a rear wall, a partial bottom wall, a top wall and first and second side walls;
    said front, rear, top and first and second side walls of said upper body portion defining a second interior space;
    said upper body portion supportably mounted on said lower body portion such that said first and second interior spaces are in communication with each other via said second access aperture and said partial bottom wall covers a second, remaining, portion of said first interior space.

2. A multi-level pet house according to claim 1 wherein each of said rear wall, said first side wall and said second side wall of said lower body portion includes a generally horizontal ledge, said removable separator being supportably mounted by said ledges of said rear wall, said first side wall and said second side wall.

3. A multi-level pet house according to claim 2 wherein a projection is formed on said ledge of each of said rear wall, said first side wall and said second side wall and corresponding slots are formed in said removable separator, each of said projections extending through said corresponding slots when said removable separator is supportably mounted by said ledges of said rear wall, said first side wall and said second side wall.

4. A multi-level pet house according to claim 3 wherein each of said rear wall and said first and second side walls of said lower body portion includes an interior side surface and wherein said multi-level pet house further comprises:
    a latching projection formed on said interior side surface of each one of said rear wall and said first and second side walls of said lower body portion;
    said removable separator supportably mounted by the projections of said ledges of said rear wall, said first side wall and said second side wall being held in place by said latching projections.

5. A multi-level pet house according to claim 1 wherein, for said upper body portion, said partial bottom wall extends forward of said front wall.

6. A multi-level pet house according to claim 1 wherein said first and second side walls of said upper body portion are longitudinally foreshortened relative to said first and second side walls of said lower body portion.

7. A multi-level pet house according to claim 6 wherein said partial bottom wall of said upper body portion further comprises an exposed top side surface, said exposed top side surface providing a first elevated perch area for said pet house.

8. A multi-level pet house according to claim 7 wherein said top and partial bottom walls of said upper body portion are generally parallel to each other, said top wall having an upper side surface which provides a second elevated perch area for said multi-level pet house.

9. A multi-level pet house according to claim 8 wherein said front, rear, first and second side and top walls of said upper body portion are formed in a generally frusto-pyramidal shape.

10. A multi-level pet house according to claim 8 wherein at least one of said first and second side walls of said upper body portion has a viewing aperture formed therein.

11. A multi-level pet house according to claim 6 wherein said first elevated perch is comprised of a recess formed in said partial bottom wall, said recess extending from said top side surface of said partial bottom wall to an interior side surface thereof.

12. A multi-level pet house according to claim 11 wherein each of said rear wall, said first side wall and said second side wall of said lower body portion includes a generally horizontal ledge, said removable separator being supportably mounted by said ledges of said rear wall, said first side wall and said second side wall.

13. A multi-level pet house according to claim 12 wherein a projection is formed on said ledge of each of said rear wall, said first side wall and said second side wall and corresponding slots are formed in said removable separator, each of said projections extending through said corresponding slots when said removable separator is supportably mounted by said ledges of said rear wall, said first side wall and said second side wall.

14. A multi-level pet house according to claim 13 wherein each of said rear wall and said first and second side walls of said lower body portion includes an interior side surface and wherein said multi-level pet house further comprises:
    a latching projection formed on said interior side surface of each one of said rear wall and said first and second side walls of said lower body portion;
    said removable separator supportably mounted by the projections of said ledges of said rear wall, said first side wall and said second side wall being held in place by said latching projections.

15. A multi-level pet house according to claim 14 wherein said interior side surface of said partial bottom wall of said upper body portion is generally level with said removable separator supportably mounted by said projections.

16. A multi-level pet house according to claim 1 wherein a third access aperture is formed in said first side wall of said lower body portion.

17. A multi-level pet house according to claim 16 wherein at least one viewing aperture is formed in said second side wall of said lower body portion.

18. A multi-level pet house according to claim 1 and further comprising at least one pet play accessory removably mounted to said upper body portion.

19. A multi-level pet house according to claim 18 wherein:
said first and second side walls of said upper body portion are longitudinally foreshortened relative to said first and second side walls of said lower body portion;
said partial bottom wall of said upper body portion further comprises an exposed top side surface, said exposed top side surface providing a first elevated perch area for said pet house; and,
an aperture which extends from said exposed top side surface to an inner side surface is formed in said partial bottom wall of said upper body portion and wherein a first portion of said pet play accessory is supportably received in said aperture.

20. A multi-level pet playhouse according to claim 18 wherein said pet play accessory is clip-mounted to said upper body portion.

21. A multi-level pet house according to claim 1 wherein:
said first and second side walls of said lower body portion are joined to said front wall of said lower body portion at first and second corners, respectively;
said first and second side walls of said lower body portion are joined to said rear wall of said lower body portion at third and fourth corners, respectively; and
one of said first, second, third and fourth corers is cut-out to define a pet play accessory-receiving recess.

22. A multi-level pet house according to claim 21 wherein a pet play accessory is mounted in said pet play accessory-receiving recess.

23. A multi-level pet house according to claim 1 wherein:
said first and second side walls of said upper body portion are longitudinally foreshortened relative to said first and second side walls of said lower body portion;
said partial bottom wall of said upper body portion further comprises an exposed top side surface, said exposed top side surface providing a first elevated perch area for said pet house; and,
said multi-level pet house further comprising an angled scratching surface coupled to said multi-level pet house and providing access to said first elevated perch area.

24. A multi-level pet house according to claim 1 and further comprising a tunnel mounted to said first access aperture.

25. A pet house comprising:
a main body portion having a front, a rear and first and second side walls, with a first access aperture formed in at least one of said walls;
an intermediate wall having upper and lower side surfaces, said lower side surface horizontally disposed over said walls of said main body portion to partially cover a first portion of said main body portion;
an upper body portion including a projecting wall having a generally frustapyramidal shape and which extends upwardly from said upper side surface of said intermediate wall, said projecting wall having a second access aperture formed therein;
said upper body portion, said intermediate wall and said walls of said main body portion defining an interior chamber;
an interior wall which separates said interior chamber into lower and upper chambers accessible by said first and second access apertures, respectively and having an interchamber access aperture formed therein; and
said second access aperture providing access from said interior chamber to said upper side surface of said intermediate wall.

26. A pet house according to claim 25 wherein:
said first and second side walls of said main body portion are joined to said front wall of said main body portion at first and second corners, respectively,
said first and second side walls of said main body portion are joined to said rear wall of said main body portion at third and fourth corners, respectively; and
one of said first, second, third and fourth corners is cut-out to define a pet play accessory-receiving recess; and
a pet play accessory is mounted in said pet play accessory-receiving recess.

27. In a multi-level cat house, the combination comprising:
a lower body portion having a bottom wall adapted to rest on a support surface and a first peripheral wall structure extending upwardly from said bottom wall and defining a first interior space;
at least one access aperture in said peripheral wall structure of a size sufficient to accommodate the entry of a cat into said first interior space;
an upper body portion having a peripheral edge and a peripheral wall structure extending upwardly from said peripheral edge and defining a second interior space; and
said peripheral edge being configured to permit said upper body portion to be removably mounted on said lower body portion in a first upright position in which said peripheral wall structure of said upper body portion extends upwardly from said lower body portion and in a second inverted position in which said peripheral wall structure of said upper body portion extends downwardly into the first interior space of said lower body portion.

28. The combination of claim 27 wherein said lower and upper body portions have a planar rectangular configuration in which each of said peripheral wall structures comprise opposing side walls and opposing end walls connected to said side walls.

29. The combination of claim 27 wherein said peripheral wall structure of said lower body portion has at least one upwardly extending recess formed on the exterior thereof to accommodate the positioning of a play accessory within said recess.

30. The combination of claim 29 further comprising a play accessory removably positioned within said recess.

31. The combination of claim 27 wherein said upper body portion comprises a frusto-pyramid terminating in an upper elevated perch.

32. The combination of claim 31 wherein said upper body portion has a lower elevated perch across a portion thereof, said lower elevated perch covering a portion of said first interior space of said lower body portion.

33. A method of assembling a multi-level pet house comprising the steps of:
providing an open-topped lower body portion having a plurality of walls which defines a first interior space, said plurality of walls of said lower body portion including a front wall in which a first access aperture is formed, a rear wall and first and second side walls;
providing an interior wall having a second access aperture formed therein;
supportably mounting said interior wall on generally horizontal ledges of said rear and first and second side walls of said lower body portion such that said interior wall covers a first portion of said first interior space;

providing a partially open-bottomed upper body portion having a front wall in which a third access aperture is formed, a rear wall, a partial bottom wall, a top wall and first and second side walls, said front, rear, top and first and second side walls of said upper body portion defining a second interior space; and supportably mounting said upper body portion on said lower body portion such that said first and second interior spaces are in communication with each other via said second access aperture and said partial bottom wall covers a second, remaining, portion of said first interior space.

34. For a multi-level pet house having a lower body portion which includes an upper side surface and a plurality of walls which define a first interior space, a removable interior wall having an access aperture formed therein and positioned to cover a first portion of said first interior space and an upper body portion which includes a partial bottom wall having upper and lower side surfaces and a plurality of walls which define a second interior space, said lower side surface of said partial bottom wall of said upper body portion supportably mounted on said upper side surface of said lower body portion and positioned such that said partial bottom wall covers a second portion of said first interior space and said second interior space communicates with said first interior space via said access aperture, a method of disassembling and storing said multi-level pet house, comprising the steps of:

disengaging said upper body portion from said lower body portion;

supportably mounting said upper side surface of said partial bottom wall of said upper body portion on said upper side surface of said lower body portion;

wherein said plurality of walls which define said second interior space of said upper body portion are received in said first interior space of said lower body portion.

35. A method of disassembling and storing said multi-level pet house according to claim 34 and further comprising the step of removing said interior wall from said lower body portion.

36. A method of disassembling and storing said multi-level pet house according to claim 35 and further comprising the step of:

inverting said upper body portion prior to supportably mounting said upper side surface of said partial bottom wall on said upper side surface of said lower body portion.

* * * * *